Figure 1:
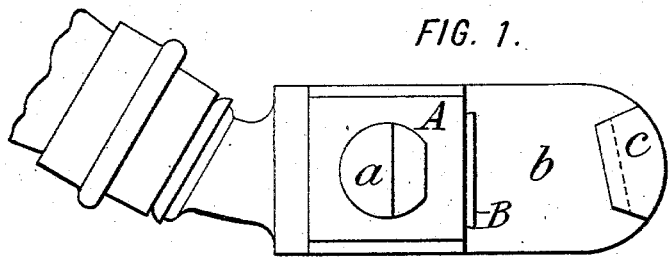

No. 704,792. Patented July 15, 1902.
E. E. GOLD.
HOSE COUPLING.
(Application filed Apr. 29, 1902.)

(No Model.) 2 Sheets—Sheet 1.

WITNESSES:
Rene Bruine
Ivel White

INVENTOR:
Edward E. Gold,
By Attorneys,

No. 704,792. Patented July 15, 1902.
E. E. GOLD.
HOSE COUPLING.
(Application filed Apr. 29, 1902.)

(No Model.) 2 Sheets—Sheet 2.

WITNESSES:
René Bruine
Fred White

INVENTOR:
Edward E. Gold,
By Attorneys,

UNITED STATES PATENT OFFICE.

EDWARD E. GOLD, OF NEW YORK, N. Y.

HOSE-COUPLING.

SPECIFICATION forming part of Letters Patent No. 704,792, dated July 15, 1902.

Application filed April 29, 1902. Serial No. 105,194. (No model.)

*To all whom it may concern:*

Be it known that I, EDWARD E. GOLD, a citizen of the United States, residing in the borough of Manhattan, city, county, and State of New York, have invented certain new and useful Improvements in Hose-Couplings, of which the following is a specification.

This invention relates to hose-couplings especially adapted for the steam-hose of railway-cars of the kind known as "straight-port" couplers. Such couplers as now commonly used as steam-hose couplers consist each of two heads, with provisions whereby they are adapted to be locked together, so that their weight tends to keep them locked, (hence being known as "gravity-couplers,") each head having at one end a seating face adapted to abut against a like face on the other head and having at its opposite end a tubular neck for engagement with the hose. As the heads are coupled together the seating faces are forced tightly together to make a steam-tight joint. The seating faces are provided with annular seats or gaskets the construction of which varies somewhat in different makes of couplers. In the Gold coupler the seats or gaskets are formed as segments of spheres and rest in spherical sockets in the heads, so that as the two seats come together either may oscillate in its socket to bring its flat outer face to an exact fit with the abutting seat, while in other makes of couplers—as, for example, the Sewall—the seat or gasket is made with a face portion of slightly yielding or compressible composition, so that the two seats in coming together may mutually yield, so as to make a sufficiently tight joint.

For many years steam-hose couplers for railway-trains were made of a uniform and standard size—that is to say, to provide for a clear passage of one and one-eighth inch diameter through the hose and coupling-head and seats. Of recent years, however, owing to the increased length of railway-trains it has become desirable to provide train-pipes, hose, and couplers of larger size, and accordingly couplers having a clear passage of from one and three-eighths to one and one-half inch diameter through the heads and seats are in use. On some roads and under some circumstances it becomes necessary to couple a car provided with such larger heads to a car provided with the smaller or standard heads, and in such case it is found that in intercoupling a larger and a smaller head it is practically impossible to make a steam-tight joint and also that the forcing together of seats of different sizes more or less injures or defaces them, this being especially noticeable with the soft or yielding seats, so that the seats when subsequently coupled to like seats of heads of like size are liable to leak. For this defect no remedy has been apparent except to apply an intermediate coupler between the larger and smaller heads, such intermediate coupler having at one end a standard seat and at the other end a seat of the larger size, so as to correctly couple with the smaller and larger heads, respectively.

My invention provides a novel and simple means for enabling coupling-heads of different sizes to be coupled together in such manner as to make a tight joint and without any liability of injuring the seats or gaskets. According to my invention I provide either head, but preferably the larger one, with what may be called a "compromise" seat—that is, with a seat or gasket which has its seating face sufficiently large to cover the larger seat and sufficiently small to cover the smaller seat. Such compromise seat as applied to a larger coupling-head resembles the normal seat of such head in every respect except that its opening is contracted to substantially the opening of the smaller seat, so that when coupled with a smaller head it engages substantially the full width of the face of the smaller seat. This compromise seat is made removable, so as to enable it to be replaced by a seat of normal size when its coupling-head is to intercouple with a like head.

The nature of my invention being thus indicated, I will proceed to describe a practical embodiment of my invention, with reference to the accompanying drawings, wherein—

Figure 2:
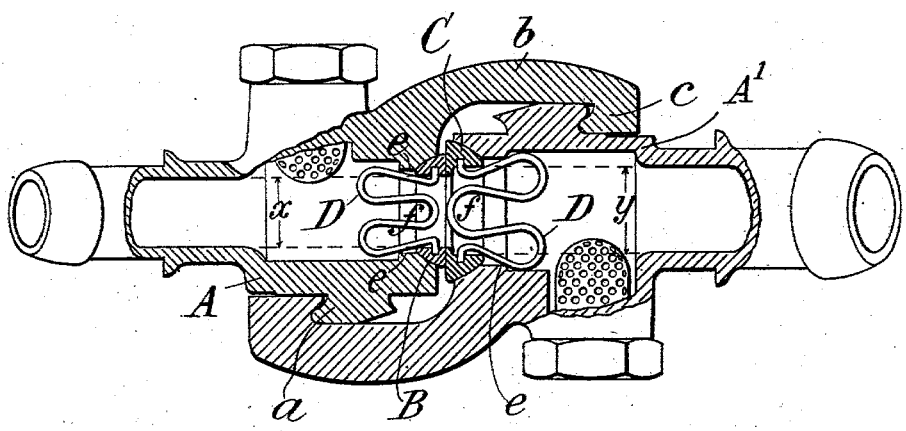
Figure 3:
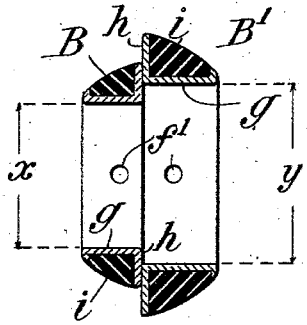
Figure 4:
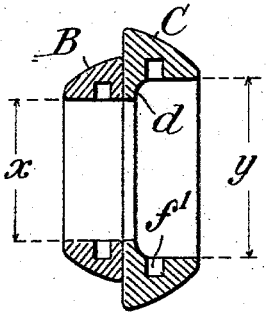
Figure 5:
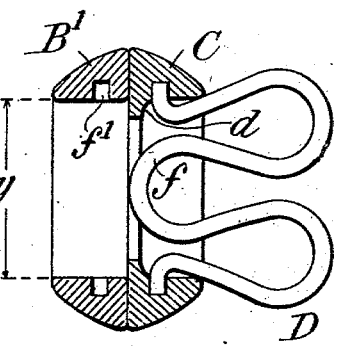
Figure 6:
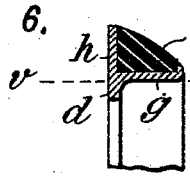
Figure 7:
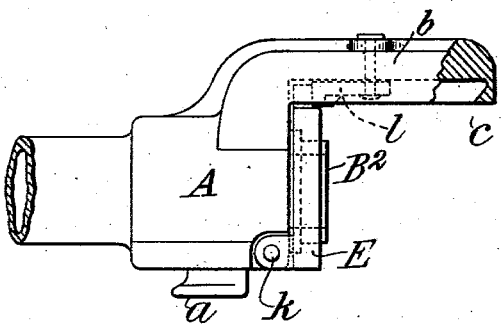
Figure 8:
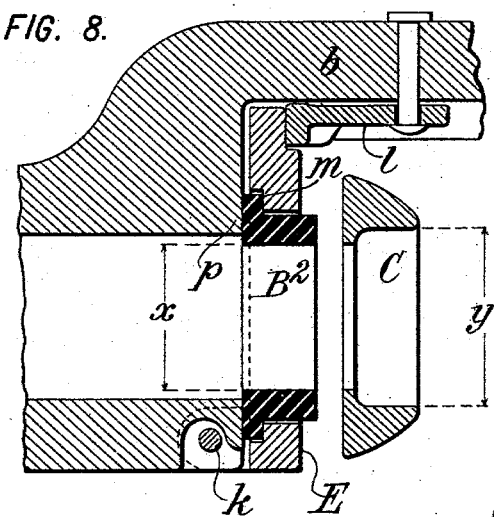
Figure 9:
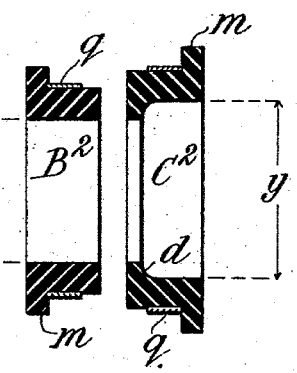
Figure 10:
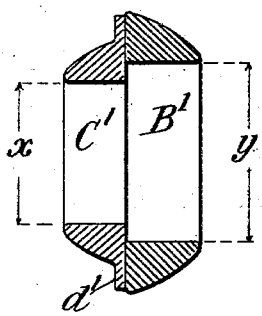
Figure 11:
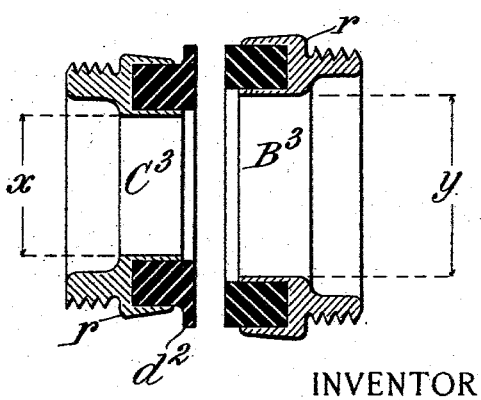

Figure 1 is a side elevation of a single head of a Gold straight-port coupler, to which my invention is applicable. Fig. 2 is a horizontal mid-section showing on the left a standard head and on the right a larger head coupled together, the latter having the compromise seat. Figs. 3, 4, and 5 are cross-sections of the seats or gaskets alone, Fig. 3 showing two Gold seats of different sizes placed face to face, Fig. 4 showing a similar Gold seat fitted to a compromise seat, and Fig. 5 showing a larger Gold seat fitted to a compromise seat. Fig. 6 is a fragmentary cross-section of a compromise seat, showing it constructed with a metal shell and a compressible packing. Fig. 7 is a plan of a different construction of straight-port coupling having a yielding seat. Fig. 8 is a horizontal mid-section of a part of Fig. 7, showing the seat in place and in juxtaposition with a Gold compromise seat. Fig. 9 is a section showing a yielding seat similar to that of Fig. 8 juxtaposed with a compromise seat of similar character. Fig. 10 shows in diametrical section two seats, the smaller one being the compromise seat. Fig. 11 shows in diametrical section two yielding or compressible seats, the smaller one being the compromise seat.

Let A A' designate the coupling-heads, the head A in Fig. 2 being a head of standard size having a clear passage of diameter $x$, and A' a head of larger size having a clear passage of diameter $y$. The construction of couplers of this kind is so well known as to require no description. Suffice it to say that the head has a steam-passage through it from end to end and at its meeting end has a suitable socket for receiving the seat B. For locking it to the reciprocal head each head has on one side a projection or lug $a$ and on the other side a projecting arm $b$, having at its end an inturned lug $c$, adapted to interlock with the lug $a$ on the other head in the well-known manner. Fig. 3 shows in juxtaposition the seat B of the smaller or standard head (of internal diameter $x$) and a normal seat B' (of internal diameter $y$) for the larger head A'. It will be understood from this view that when a larger and smaller head are coupled together the flat abutting faces of the seats B B' by reason of their differing size do not abut for the full width of the faces of each seat, but for only about half said width, and consequently the pressure exerted to force them together, as in the case of two like seats, affords a much less perfect joint, which practically results in leakage and in a greater or less degree of injury to the faces of the seats. To avoid this result, whenever a smaller and larger head are to be intercoupled I provide one of them, and preferably the larger one, with a compromise seat, which is shown at C in Fig. 4. This compromise seat C has the peculiar quality that its seating face is as large as that of a larger seat and as small as that of a smaller seat, so that it is capable of coupling with either and making with either a joint of the full width of the seating face thereof. This is illustrated in Fig. 4, where the compromise seat C is coupled with a smaller or standard seat B, also in Fig. 5, where it is coupled with a larger seat B'. The compromise seat C is or may be a precise duplicate of the larger seat, with the exception that it has an inturned flange or contracted portion $d$, whereby the opening through the seat is reduced to substantially the same as that through the smaller seat B, as is apparent from Fig. 4. Whenever a larger and smaller coupling-head are required to be intercoupled, it is only necessary to remove from the larger head its normal seat B' and replace it with the compromise seat C, this having been done in the head A', (shown in Fig. 2,) whereupon when the two heads are coupled together a perfect joint is made, as is apparent from Fig. 2. Subsequently when the larger head A' is required to be coupled with another (like) larger head it is preferable to remove the compromise seat C and replace it with a larger seat B' in order to have the advantage of the full area of opening through the coupling. If, however, a trainman should forget to do this, or to have no seat B' at hand, the only disadvantage will be that the passage between the heads will be slightly choked by reason of the flange $d$ projecting into it, as shown in Fig. 5.

It is apparent from the foregoing description that the compromise seat C and the normal seat which it replaces (preferably the seat B') should be readily removable in order that either may be replaced by the other. This is provided for in the Gold coupling as heretofore constructed and which in this respect is not altered by my present invention. In the Gold coupling the seat or gasket is made as the segment of a sphere and is seated in a socket of like spherical form in the head, so that the seat may rock in its socket to adapt itself to the opposite seat, and the seat is held in place in its socket by a retaining-spring D, which is made of the shape shown in Fig. 2, although other shapes or kinds of springs would be admissible. The spring as made engages at its ends in recesses in the seat and is bent, so that it engages a suitable shoulder at $e$ within the passage in the head. To remove the seat, it is only necessary to insert a hook into the middle bend $f$ of the spring, whereupon by pulling or jerking outwardly the spring and seat can be pulled out, after which another seat can be pushed in, the spring yielding as it enters. This same construction applied to the compromise seat C and to the larger normal seat B' enables either to be readily removed or replaced by the other.

The spherical or self-compensating seats of the Gold couplings may be made yielding or unyielding, the latter being preferable. A suitable construction is that which is shown in Figs. 3 and 6, where the inner or cylindrical part $g$ and the flat face $h$ are made of metal, preferably brass, and the portion $i$ is of slightly-yielding composition, adapted to be pressed into steam-tight fit with the socket, while the flat face $h$ makes a flat abutting fit with the like face on the opposite seat. Another suitable construction is that shown in Figs. 4 and 5, where the seat is wholly composed of metal, being ground or otherwise reduced to a true plane upon its flat seating face and to a true sphere upon its outer face in order to make a steam-tight joint.

The compromise seat provided by my invention is readily convertible into a normal seat of the larger size in the event that the compromise seat is no longer required. For example, a given road might be equipped with couplers, hose, &c., of a larger size and its cars may have to intercouple with cars of a connecting road which are equipped with the smaller couplers, hose, &c., and while this condition continues the compromise seats will be used whenever such intercoupling is required. In course of time the connecting road may become equipped with couplers, hose, &c., of the larger size, in which case the compromise seat will be no longer useful, and in such case they may be converted into normal seats of the larger size by simply removing the internal flange $d$, which can readily be done by turning or reaming out to the line $v\ v$ in Fig. 6, so that the inner surface of the seat shall be enlarged to the full diameter $y$ of the larger seat $B'$. To this end in a seat constructed with a metal shell and yielding packing material, as shown in Figs. 3 and 6, the flange $d$ is formed solely on the metal portion, so that this flange can be removed without impairing the integrity of the metal shell. The spring D, Figs. 2 and 5, engages the portion of the compromise seat C which is back of the flange $d$ and is of the larger diameter $y$, so that after removing the flange $d$ the same spring can be replaced, its relation with the seat being in no wise altered. The spring is shown of the shape commonly used in the Gold-coupler seats, having outturned ends which enter diametrically opposite recesses $h\ h$ in the seat or gasket.

Fig. 7 shows another construction of straight-port coupler, wherein the seat instead of being spherical or self-adjusting is made of slightly-yielding material in order by compression to conform itself to the opposite seat. The particular coupler here shown is known as the "Sewall" coupler, the seat $B^2$ being held to the head A by a retaining-ring E, which is shown as hinged to the head at $k$, its opposite side being fastened by an eccentric piece $l$, this being a known construction. The seat or gasket $B^2$ has an outward flange $m$ at its base, which is received in a recess in the ring E and by which the ring clamps the gasket in place, so that when the pressure of the opposite head comes against it and forces it backward the yielding of this seat enables it to make a sufficiently tight joint at its inner side with the face $p$ of the coupling-head and at its outer side with the face of the abutting seat or gasket. My invention is applicable to this or any analogous construction of coupler, not being confined to the construction first described.

In Fig. 8 I have shown a compromise seat C applied in proximity to the seat $B^2$, the seat C being the self-adjusting seat of the Gold coupler, to show that when a Gold and Sewall coupler are intercoupled, the Gold coupler provided with this compromise seat, the latter is adapted to make a tight joint with the seat $B^2$. In case two Sewall couplers of different size are so coupled the larger may be provided with a compromise seat $C^2$, as shown in Fig. 9, which has an inturned flange or contraction $d$ to reduce it to substantially the size of the abutting seat $B^2$. In Fig. 9 the seats are shown with a metal shell or thimble $q$, which, however, is not essential.

Another construction of soft or compressible seat is shown in Fig. 11, where the seat $B^3$ is the seat for the larger coupler and is provided with a metal shell $r$, adapted to screw into a threaded socket in the coupling-head in a well-known manner.

My invention is not limited to making the compromise seat replace the larger of the two seats, although this is the preferable construction. In Fig. 10 a compromise seat $C'$ is shown adapted to replace the smaller seat B, Fig. 3, and to conform to the face of the larger seat $B'$. To this end it is provided with an external flange $d'$, by which it is expanded to substantially the diameter of the larger seat. The same construction applied to a yielding or compressible seat is shown in Fig. 11, where the seat $C^3$ is formed with an outer flange $d^3$, adapted to conform to the face of the opposing seat $B^3$.

My invention is not necessarily limited in its application to straight-port couplers, but is applicable to any type or kind of coupler where two heads are to be intercoupled having openings or passages of different sizes.

I claim as my invention—

1. In a hose-coupling, the combination with coupling-heads of different sizes adapted to intercouple, the said heads having normal seats of different sizes of opening, of a compromise seat adapted to replace one of said normal seats and adapted to conform to the face of the other seat to make a tight joint.

2. In a hose-coupling, two coupling-heads of different sizes adapted to intercouple, having abutting seats, the seat of the larger head contracted to substantially the opening of the smaller head whereby to engage substantially the full face of the seat thereof to make a tight joint.

3. In a hose-coupling, the combination with coupling-heads of different sizes adapted to intercouple, said heads having normal seats of different sizes of opening, of a compromise seat adapted to replace one of said normal seats and adapted to conform to the face of the other seat to make a tight joint, and said seats respectively adapted to be removable from the head to enable either to be replaced by the other.

4. In a hose-coupling, two coupling-heads of different sizes adapted to intercouple, having abutting seats, the seat of the larger head consisting of a segment of a sphere fitting in a spherical socket in said head and contracted to substantially the opening of the smaller head whereby to engage substantially the full face of the seat thereof to make a tight joint.

5. In a hose-coupling, the combination with coupling-heads of different sizes adapted to intercouple, the said heads having normal seats of different sizes of opening, of a compromise seat adapted to replace one of said normal seats and adapted to conform to the face of the other seat to make a tight joint, and said compromise seat having a flat unyielding seating face of metal adapted to engage either a hard or soft abutting seat without injury to the face of the latter.

6. A compromise seat for a hose-coupler, having the form of a normal seat of the larger size, and an internal flange extending its seating face inwardly, said flange adapted to be removed to convert the compromise seat into a larger normal seat.

7. A compromise seat for a hose-coupler having the form of a normal seat of the larger size with the addition of an internal flange extending its seating face inwardly, and a retaining-spring engaging the inner face of the seat behind said flange, so that said flange may be removed to convert the compromise seat into a larger normal seat without incapacitating said spring.

In witness whereof I have hereunto signed my name in the presence of two subscribing witnesses.

EDWARD E. GOLD.

Witnesses:
   THOMAS F. WALLACE,
   FRED WHITE.